United States Patent [19]
Kohler et al.

[11] Patent Number: 5,983,110
[45] Date of Patent: Nov. 9, 1999

[54] METHOD FOR OPERATING A TELECOMMUNICATIONS SYSTEM, AND A TELECOMMUNICATIONS SYSTEM IN WHICH THE METHOD CAN BE USED

[75] Inventors: Mathias Kohler; Knut Haberland-Schlosser, both of Bochum, Germany

[73] Assignee: Nokia Mobile Phones Limited, Espoo, Finland

[21] Appl. No.: 08/844,234

[22] Filed: Apr. 18, 1997

[30] Foreign Application Priority Data

Apr. 19, 1996 [DE] Germany .................. 196 15 563

[51] Int. Cl.⁶ .................................................. H04Q 7/32
[52] U.S. Cl. ................................... 455/462; 455/450
[58] Field of Search ................................. 455/450, 455, 455/460, 462, 464, 465, 466, 453, 528, 574, 575, 463, 452, 426; 379/209

[56] References Cited

U.S. PATENT DOCUMENTS

| | | | |
|---|---|---|---|
| 4,159,448 | 6/1979 | Parham | 340/825.63 |
| 4,551,583 | 11/1985 | Sekiguchi et al. | 179/99 |
| 4,768,219 | 8/1988 | Yamagata | 455/464 |
| 4,882,766 | 11/1989 | Akaiwa | 455/528 |
| 5,016,002 | 5/1991 | Levanto | 340/756 |
| 5,237,603 | 8/1993 | Yamagata | 455/464 |
| 5,325,420 | 6/1994 | Kikuchi | 455/567 |
| 5,371,782 | 12/1994 | Casey, III et al. | 455/465 |
| 5,446,553 | 8/1995 | Grube | 455/435 |
| 5,598,412 | 1/1997 | Griffith et al. | 455/466 |
| 5,657,464 | 8/1997 | Hareyama | 455/462 |
| 5,678,189 | 10/1997 | Barnes | 455/462 |
| 5,689,549 | 11/1997 | Bertocci et al. | 455/463 |
| 5,799,250 | 3/1996 | Veloso et al. | 455/555 |
| 5,802,483 | 11/1996 | Morris | 455/557 |
| 5,805,578 | 10/1993 | Okamoto et al. | 455/462 |
| 5,809,417 | 11/1994 | Nealon et al. | 455/464 |

FOREIGN PATENT DOCUMENTS

4207775 A1   9/1993   Germany .

OTHER PUBLICATIONS

"DECT–Cordless Functionality in New Generatio Alcatel PABXs" V. Werbus et al., Elec. Comm 1993.
"DECT–EIN Standard fur schnurlose Telekommunikation", 1995, pp. 462–469.
"Struktur des DECT–Standards" U. Pilger, Berlin 42 1992, pp. 23–29.

*Primary Examiner*—Dwayne D. Bost
*Assistant Examiner*—Jean A. Gelin
*Attorney, Agent, or Firm*—Perman & Green, LLP

[57] ABSTRACT

The invention relates to a method for operating a telecommunications system having a switching station (BS) and a plurality of internal subscriber stations (HA1, HA2, HA3, HA4) which are connected to it and with whose aid the switching station (BS) can simultaneously operate a limited number of channels of the same or a different type and is characterized in that the switching station (BS) reports to all the internal subscriber stations (HA1, HA2, HA3, HA4) by transmitting a respective busy signal that a channel of the appropriate type is not available, each internal subscriber station (HA1, HA2, HA3, HA4) is changed by the busy signal to a state in which it cannot initiate a connection being set up on the corresponding channel. It furthermore relates to a telecommunications system for carrying out the method, which is characterized in that the switching station (BS) contains a signal generator (SG) which produces a respective busy signal and sends it to all the internal subscriber stations (HA1, HA2, HA3, HA4) when a channel of corresponding type is not available, and each of the internal subscriber stations (HA1, HA2, HA3, HA4) contains a blocking device (B), which can be driven by the respective busy signal and, on reception of the respective busy signal, changes the internal subscriber station (HA1, HA2, HA3, HA4) to a state in which it cannot initiate a connection being set up on the corresponding channel.

4 Claims, 3 Drawing Sheets

METHOD FOR OPERATING A TELECOMMUNICATIONS SYSTEM, AND A TELECOMMUNICATIONS SYSTEM IN WHICH THE METHOD CAN BE USED

CROSS REFERENCES TO RELATED APPLICATIONS

Not Applicable

BACKGROUND OF THE INVENTION

The invention relates to a method for operating a telecommunications system having a switching station and a plurality of internal subscriber stations which are connected to it and with whose aid the switching station can simultaneously operate a limited number of channels of the same or a different type, and to a telecommunications system in which the method can be implemented.

It is advantageous for a subscriber to know the current state of, for example, a cordless telecommunications system. In general, information about the system state is transmitted in the form of signal tones (free tone, busy tone). It is disadvantageous that this information is not received until during or after the setting up of a connection. Furthermore, this information is also not adequate for many applications. This is the case in particular when a plurality of subscriber stations are connected to a switching station in a telecommunications system, which switching station is in turn connected to a plurality of exchange lines, and the switching station has only a limited capacity for simultaneously possible internal and/or external connections. The user who wishes to set up, for example, a connection to another subscriber cannot decide just on the basis of the busy tone whether the dialled subscriber number is currently busy or whether the telecommunications system is overloaded and therefore cannot set up the connection. Furthermore, repeated futile dialling of a subscriber number, after each of which attempts a busy tone can once again be heard, which not only severely stresses the user's patience, but also severely loads the battery in the internal subscriber station. This is further compounded by the load of the environment in which the telecommunications system is located, by radio traffic and by the additional loading of the system itself. This futile dialling must be accepted if the dialled subscriber number is actually busy, but these repeated dialling processes are particularly annoying when caused by overloading of the telecommunications system being used.

The object of the present invention is therefore to provide a method and a device by means of which the previously described disadvantages are overcome, that is to say by means of which a subscriber station and/or the subscriber using this subscriber station is better informed about the system state with regard to overloading of the telecommunications system, and by means of which repeated dialling processes are avoided in which it is impossible for a connection to be set up because the telecommunications system is overloaded.

The achievement of this object is defined in terms of the method in the characterizing part of Patent claim 1, and its achievement in terms of the device is defined in the characterizing part of Patent claim 10, advantageous refinements and developments in each case being located in the subsequent subclaims.

The method according to the invention for operating a telecommunications system having a switching station and a plurality of internal subscriber stations which are connected to it and with whose aid the switching station can simultaneously operate a limited number of channels of the same or a different type is characterized in that the switching station reports to all the internal subscriber stations by transmitting a respective busy signal that a channel of the appropriate type is not available, and each internal subscriber station is changed by the busy signal to a state in which it cannot initiate a connection being set up on the corresponding channel.

The transmission of a busy signal to each subscriber station which is connected to the switching station, when all the internal or external channels are busy, results in the internal subscriber station being signalled as to whether a connection is possible before the process of setting up a connection rather than not until during or after the setting up of a connection. If the setting up of a connection is started, because of this information, only when the system has sufficient free capacity, then, once a connection has been set up, a busy tone is produced only when the dialled destination is actually busy. By changing each subscriber station to a state in which it can no longer initiate a connection being set up in the corresponding channels, this indicates to the user, even before the frequently tedious dialling process, that a connection is currently impossible because of the limited system capacity. Furthermore, this measure saves the energy which is required on each occasion for the redialling in the internal subscriber station. It should also be noted in particular that, as a result of this method, the radio traffic which is required in an overloaded telecommunications system for setting up a line can be considerably limited.

A telecommunications system according to the invention having a switching station and a plurality of internal subscriber stations which are connected to it and with whose aid the switching station can simultaneously operate a limited number of channels of the same or a different type is characterized in that the switching station contains a signal generator which produces a respective busy signal and sends it to all the internal subscriber stations when a channel of corresponding type is not available, and each of the internal subscriber stations contains a blocking device, which can be driven by the respective busy signal and, on reception of the respective busy signal, changes the internal subscriber station to a state in which it cannot initiate a connection being set up on the corresponding channel.

This embodiment according to the invention is particularly advantageous for carrying out the method according to the invention, since the signal generator can thus be contained in the signal-processing circuit section of the switching station, and the blocking device can be implemented by the processor of the internal subscriber station.

The method is furthermore characterized in that the respective busy signal is buffer-stored in each internal subscriber station.

The buffer storage results in the respective busy signal not having to be transmitted continuously to the subscriber stations, and nevertheless permanently being available in the subscriber station in the event of a corresponding busy channel.

According to a development of the method, the various types of channels may be external or internal channels.

This distinction allows a subscriber to distinguish from the start whether he can still receive external or internal connections, since a dedicated busy signal is in each case present for them.

According to another development of the method, the various types of channels may be channels for controlling functions of the switching station.

This advantageous development of the method allows the advantages according to the invention to be available not only for connections between the internal subscriber stations and other internal or external subscriber stations, but also for programming or for calling up special functions of the switching station via the service access or accesses which can be dialled like an internal telephone number.

The method is still further characterized in that the various types of channels are voice channels or data channels.

This advantageous development results in the advantages which the invention offers in addition to normal voice connections, for the use of data connections as well. In consequence, for example, cordless fax units can considerably limit their radio traffic.

The method is also characterized in that, if at least one of the channels becomes free, the switching station sends a respective reset signal to all the internal subscriber stations in order to change them once again to a state in which it is possible for them to initiate a connection being set up on the corresponding channels.

As a result of this advantageous refinement of the method according to the invention, the channel state (the state as to whether the internal or the external voice and/or data channels or the channels for controlling functions in the exchange are or are not busy) does not need to be transmitted and checked continuously, but only when a state change occurs. In order to carry out the method, the actually current information about the channel state is permanently present in the subscriber station in that, after any change in the state, it is transmitted to the subscriber station, is stored there and, when new information arrives, is overwritten by it.

In this case, permanently means that the information which was received at an earlier time is in each case overwritten, and the current state is therefore permanently present. The information is lost when the subscriber station is switched off. This is not disadvantageous since the subscriber station is transmitted the respectively current busy signal or reset signal at the latest when a change in the channel state occurs after it is switched on. In this case, it is also necessary to consider the situation in which the internal subscriber station was not able to record a change in the channel state during the phase when it was switched off and thus information which was stored through the switched-off phase would not be up to date. The current channel state can advantageously be transmitted to the internal subscriber station, from the switching station, in an initialization phase after the internal subscriber station has been switched on.

Another refinement of the method is characterized in that visual or audible indications are driven by the busy signal.

This indication option allows the user to know even before a connection attempt whether he can successfully carry out such an attempt and under some circumstances therefore does not need to initiate this, since the capacity of the telecommunications system has already been exhausted in terms of the desired channel.

The information about channel overloading can be transmitted quickly and clearly to a user by such a visual representation by means of an already existing display on the internal subscriber station or by means of additional light or indication units which are present on the internal subscriber station.

By means of the audible information option, the information about channel overloading is transmitted to the user in the conventional manner, this taking place immediately after lifting the handset, or a corresponding action. This can additionally be done for one of the other indication types, or just for the one. The user therefore does not need to monitor specific indications, for example, even before an attempt to set up a connection, but is informed immediately before then, nevertheless, by the indication of a respective busy signal that it is impossible to set up a connection on a corresponding channel. This can be done by the acoustic presentation of the channel information itself or by a cue to look at the visual indications.

Yet another development of the method is characterized in that, a connection which corresponds to a dialled number which is stored in the internal telephone is automatically set up via a channel when the internal subscriber station receives the reset signal for this channel.

By such automatic redialling without involving lines or radio channels, the user is saved having to activate the redialling, and the system is not loaded by pointless redialling attempts to the internal subscriber stations which are connecting to the switching station. If the system load permits a renewed dialling attempt, then all the internal subscriber stations are informed of this and a station whose user wishes to set up a connection can do so immediately and automatically without having to start a futile connection setting up process at specific time intervals. This advantageous refinement of the invention provides a redialling option which, while saving a considerable amount of energy and while maintaining all the advantages which have already been mentioned above in the internal subscriber station, provides the quickest possible possibility for successful redialling.

A further refinement of the method according to the invention is characterized in that radio channels are used at least as internal channels.

A telecommunications system according to the invention is advantageously characterized in that each internal subscriber station contains a memory device for storing the respective busy signal.

Said telecommunications system is furthermore characterized in that each internal subscriber station contains a reset circuit for erasing the respective stored busy signal, and the reset circuit can be driven by a respective reset signal from the switching station which produces the respective reset signal if at least one of the corresponding channels becomes free, and sends said reset signal to all the internal subscriber stations.

Yet another advantageous refinement of a telecommunications system according to the invention is characterized in that each internal subscriber station contains visual or audible indication devices which can be switched on and off corresponding to the respective busy signal for each group of channels.

Finally, a telecommunications system according to the invention is characterized in that the internal subscriber stations are radio telephones, cordless telephones, cordless fax units or other devices for remote data transmission.

An exemplary embodiment for the implementation of the method according to the invention in a telephone system according to the invention will be explained in the following text with reference to the figures, in which.

Figure 1:
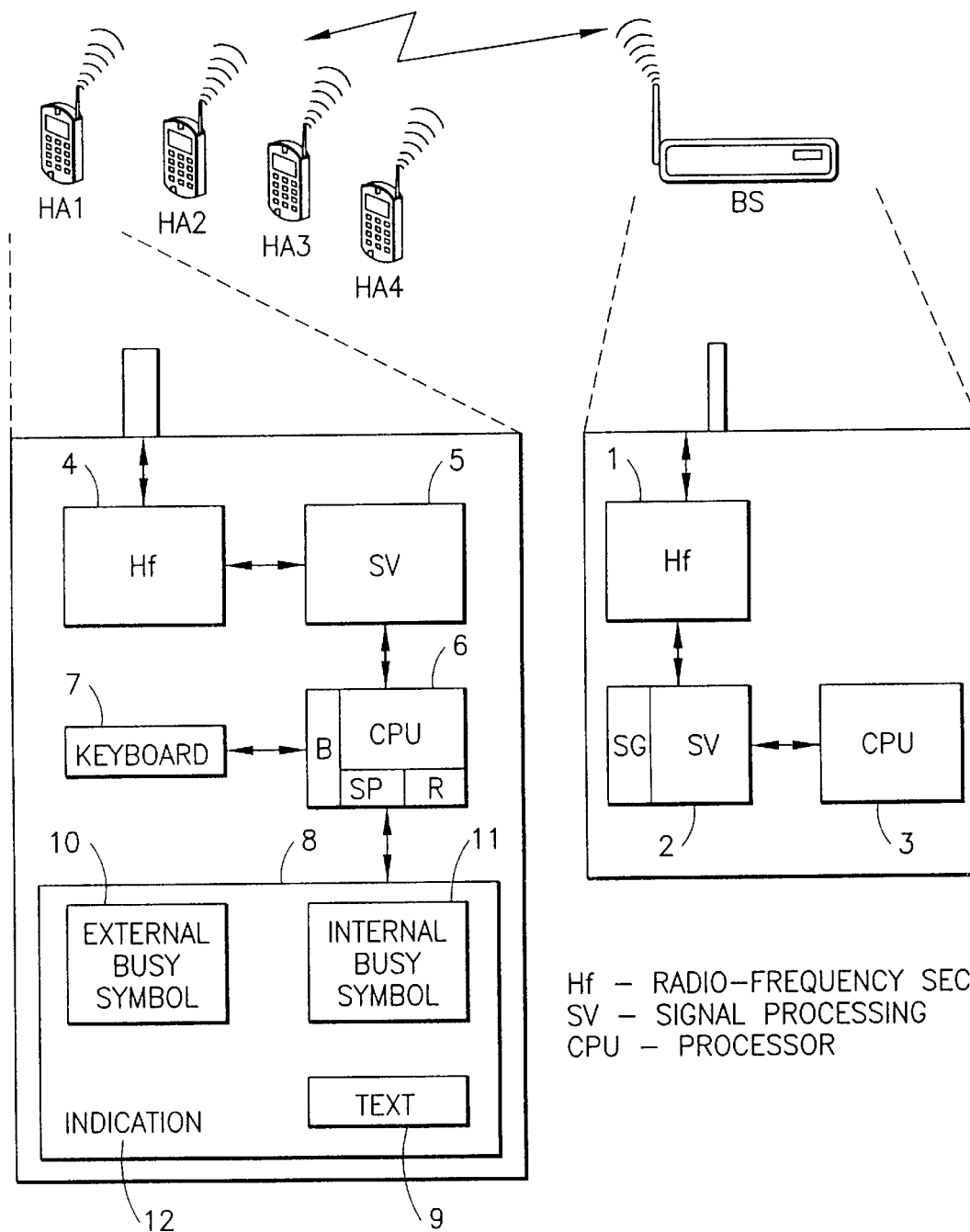
FIG. 1 shows a block diagram of a communications system according to the invention, in this case a cordless telecommunications system for the private area.

A cordless telephone system for the private area, as can be seen in FIG. 1, is used as an example here. The system comprises a base station BS and one or more handsets HAn. In this case there are four handsets HA1, HA2, HA3 and HA4 which are each connected to the base station via a radio path.

The base station BS comprises a radio-frequency section 1 for interchanging information with the respective handsets HAn which are each used as a subscriber station, a signal processing circuit 2 which is connected bidirectionally to the radio-frequency section 1 and, inter alia, contains a signal generator SG for producing the respective busy signal and the respective reset signal, and a processor 3 which is connected bidirectionally to the signal processing circuit 2.

A handset HAn comprises a radio-frequency section 4 for interchanging information with the base station BS, a signal processing circuit 5 which is connected bidirectionally to the radio-frequency section 4, a processor 6 which is connected bidirectionally to the signal processing circuit 5 and, inter alia, contains a blocking device B for blocking the setting up of a connection on a channel corresponding to the respective busy signal, a memory device SP for storing the respective busy signal and a reset circuit R for erasing the respective busy signal, and furthermore comprises a keyboard 7 which is connected to the processor 6, and an indication unit 8, which is also connected to the processor 6. The indication unit comprises a text display 9, a symbol 10 to indicate that all the external lines are busy, and a symbol 11 for indicating that all the internal lines are busy. The symbols may optionally also be designed as separate indication elements, for example using light-emitting diodes.

The switching station BS can also combine the function of the previously described switching station BS with that of one of the previously described handsets HAn. If this is the case, then connections can also be set up directly from the switching station.

In these systems, the number of calls which can be carried out simultaneously is in general limited. Mostly, there is an upper limit both for the number of external calls which can be carried out simultaneously, this number depending on the external exchange lines, and for the number of internal calls which can be carried out between different subscribers within the system as well via the simultaneously possible accesses to the service access, via which the switching station can be programmed or via which special functions can be called up, such as call duration for example.

In order to allow the capabilities of the telecommunications system, which are limited in this way, to be used optimally, each subscriber should be able to identify whether a specific telephone call, for example an external call, is possible at all. In order to limit the radio traffic in an overloaded telecommunications system and in order to save energy in the handsets, any connection which cannot be set up is blocked from the start.

According to the invention, each handset and the subscriber using it is informed of the system state in terms of channel overloading. After each change in the state, an information item is transmitted to those subscriber stations which are present and are switched on, using one of three transmission methods which are described in the following text. Depending on the telecommunications standard used, other existing methods for regular transmission of information may also be used, however.

The information takes account of whether all the existing exchange lines are busy, whether the system is busy internally, or whether the service access (for example for programming the switching station) is busy. At the same time, it is also possible to distinguish between free and busy voice or data channels. So far, only one undifferentiated system busy information item has been standardized for the DECT (Digital Enhanced Cordless Telecommunications) Standard, although this does not allow any limitations to be implemented in terms of the connection possibilities via special channels.

Figure 2:
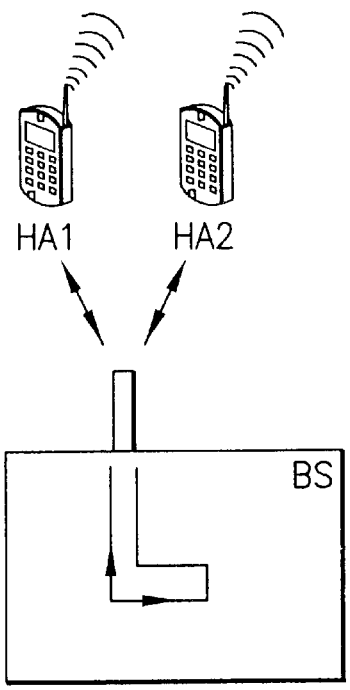
FIG. 2 to FIG. 4 show examples of various channel types.
Figure 3:
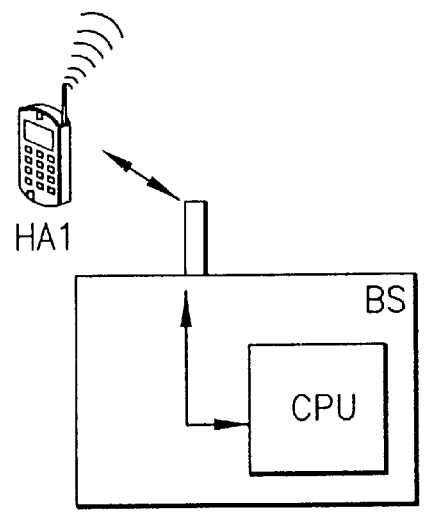
Figure 4:
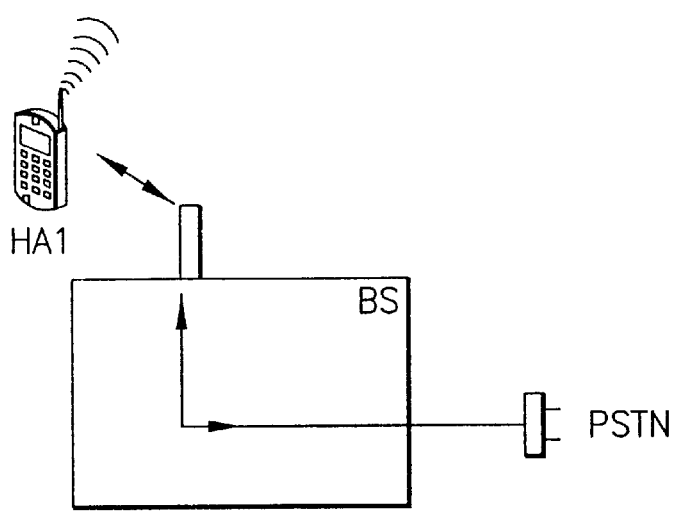

FIGS. 2 to 4 show examples of various channel types.

FIG. 2 illustrates an internal channel. In this case, two of the internal handsets are communicating with one another, for example HA1 and HA2. The other handsets, in this case HA3 and HA4, can no longer receive any internal connection if there is a limitation to only one internal channel. In order that any connection attempt by them is not carried out repeatedly, a busy signal for the internal channel is transmitted to all the handsets HAn from the signal generator SG of the base station BS. This busy signal is stored in the respective memories SP of the handsets HAn. It is then no longer possible to set up a connection on the internal channel in each case in the handsets HAn, because of the blocking device B. In addition, an indication is produced that the internal channel is fully loaded, that is to say that no further internal connections are possible at the moment. The handsets HA3 and HA4 thus both indicate to their users that no internal connections are possible and suppress initiation of a connection being set up on the internal channel. Once the handsets HA1 and HA2, which are communicating with one another, have released the internal channel again, the signal generator SG of the base station transmits a reset signal for the internal channel to all the handsets. The busy signal which is stored in each of the memories SP of the handsets Han for the internal channel is now erased by the reset circuit R, and the blocking device B permits initiation of a connection being set up on the internal channel again. In addition, an indication is produced that the internal channel is free again, that is to say that it is once again possible to set up an internal connection.

FIGS. 3 and 4 show a channel for controlling functions of the base station BS, and an external channel. The blocking and reset process in each case corresponds to that for the internal channel.

In addition to blocking connections which are not possible, there are in principle two further possibilities, which can also be used jointly, for evaluating the received data in the subscriber station:

1. the information is evaluated in order to control further functions in the subscriber station,
2. the information is indicated to the subscriber.

Automatic evaluation of the information by the subscriber station allows further functions to be controlled, for example automatic redialling without involving lines or radio channels.

This is implemented such that, for example, a handset HAn which is blocked by the busy signal for the internal channel nevertheless allows an internal subscriber number to be entered and, after reception of the reset signal for the internal channel and once the busy signal has been erased again from the memory SP by the reset circuit R and the channel has been released again by the blocking device B, automatically initiates a connection being set up.

A multiplicity of media may be used for directly presenting the system information, for example symbols on the display of the handset HAn, in this case a symbol for "exchange line(s) busy" and a symbol for "system internally busy", text messages on the display of the handset HAn, light-emitting diodes on the handset HAn, or else signal tones after the handset has been lifted off, or a corresponding action. The last variant is possible even without permanent transmission being required. The subscriber himself evaluates this information and decides on what measures he can take.

As a result of the fact that the channel information is permanently available in the handset HAn, unnecessary loading of the system by futile attempts to set up a connection is avoided in every case. Furthermore, energy is saved in the handsets and the radio traffic is reduced.

The DECT Standard offers three obvious methods for transmitting system information independently of a connection. These are outlined in the following text.

1st Method: MAC Page Message

Figure 5:
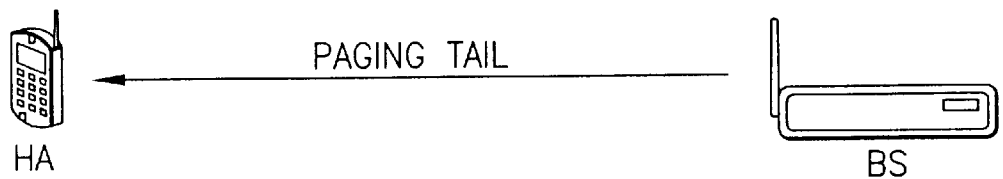
FIG. 5 to FIG. 7 show examples of the signals between the subscriber station and a handset according to various transmission methods.

In the first method, which is illustrated schematically with only one handset HA in FIG. 5, system information is sent in "MAC page messages" to all the synchronized handsets. In the MAC Paging Tail Format for "Zero page message" or "short page message", 12 bits are available in a message for manufacturer-dependent information. These bits are notified as "escape" in the "info type" field of the message.

This method corresponds essentially to the transmission method for standardized "system busy" information and involves a low implementation cost.

2nd Method: Simple Short Message Service CLMS (Connection Less Message Service)

Figure 6:
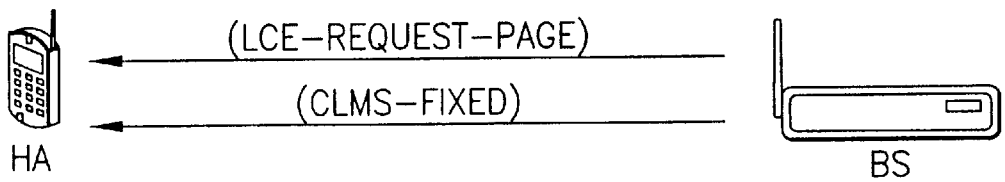

In the second method, which is illustrated schematically with only one handset HA in FIG. 6, system information is sent in the layer 3 message (CLMS-FIXED) to all the synchronized handsets in a user group. 20 bytes are available in a message for manufacturer-dependent information. The sending of these messages can be notified by a (LCE-REQUEST-PAGE) message.

3rd Method: Short Message Service

Figure 7:
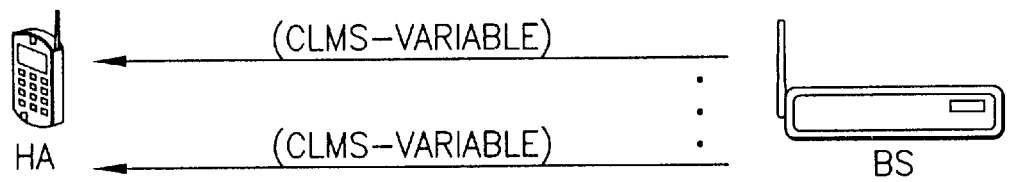

In the third method, which is likewise illustrated schematically with only one handset HA in FIG. 7, system information is sent in the layer 3 message (CLMS-VARIABLE) to all the synchronized handsets in a user group. Up to 120 bytes can be made available in a message for manufacturer-dependent information, provided segmentation is supported.

This method is defined in a DECT Data Profile Standard and involves the highest implementation cost of the methods proposed here.

We claim:

1. In a telecommunications system including a base station and a plurality of internal subscriber stations, said base station and said subscriber stations operatively associated to communicate over a plurality of types of channels, said types of channels including multiple external channels, multiple internal channels, and at least one service channel, a method for operating said system comprising the steps of:

monitoring the status of channels available as an external channel, an internal channel, and a service channel;

generating, at said base station, a separately identifiable busy signal indicative of each of said types of channels;

transmitting the appropriate one of said signals to the subscriber stations when all of the channels of a type are not available;

receiving said signal at said subscriber stations; and blocking said subscriber stations from initiating a communication on a channel of the type indicated by said signal.

2. In a telecommunications system including a base station and a plurality of internal subscriber stations, said base station and said subscriber stations operatively associated to communicate over a plurality of types of channels, said types of channels including multiple external channels, multiple internal channels, and at least one service channel, a method for operating said system, as described in claim 1, further comprising the steps of:

generating a reset signal in the base station when channels of a type become available;

transmitting said reset signal to said subscriber stations; and unblocking said subscriber station to allow said subscriber station to initiate a communication in response to said reset signal.

3. A telecommunications system including a base station and a plurality of internal subscriber stations, said base station and said subscriber stations operatively associated to communicate over a plurality of types of channels, said types of channels including multiple external channels, multiple internal channels, and at least one service channel, said system comprising:

a monitor, within the base station, for collecting and storing data with respect to the status of channels available as an external channel, an internal channel, and a service channel;

a signal generator, within the base station, constructed to generate a separately identifiable busy signal indicative of each of said types of channels;

a transmitter, within the base station, constructed to send the appropriate one of said signals to the subscriber stations when all of the channels of a type are not available;

a receiver, within the subscriber stations, constructed receive said signal; and a blocking module, within said subscriber stations, constructed to restrict subscriber stations from initiating a communication on a channel of the type indicated by said signal.

4. A telecommunications system including a base station and a plurality of internal subscriber stations, said base station and said subscriber stations operatively associated to communicate over a plurality of types of channels, said types of channels including multiple external channels, multiple internal channels, and at least one service channel, said system, as described in claim 3, wherein said signal generator generates a reset signal when channels of a type become available; said transmitter sends said reset signal to said subscriber stations; said receiver receives the reset signal; and said blocking module resets said subscriber station to allow said subscriber station to initiate a communication in response to said reset signal.

* * * * *